US010949070B2

United States Patent
Makovsky

(10) Patent No.: US 10,949,070 B2
(45) Date of Patent: Mar. 16, 2021

(54) CUSTOMIZABLE MOBILE APPLICATION FOR EVENT MANAGEMENT

(71) Applicant: ServiceNow, Inc., Santa Clara, CA (US)

(72) Inventor: Bnayahu Makovsky, Kiryat-Ono (IL)

(73) Assignee: ServiceNow, Inc., Santa Clara, CA (US)

( * ) Notice: Subject to any disclaimer, the term of this patent is extended or adjusted under 35 U.S.C. 154(b) by 68 days.

(21) Appl. No.: 16/352,529

(22) Filed: Mar. 13, 2019

(65) Prior Publication Data

US 2020/0293184 A1      Sep. 17, 2020

(51) Int. Cl.
| | |
|---|---|
| *G06F 9/451* | (2018.01) |
| *G06F 3/0484* | (2013.01) |
| *G06F 9/54* | (2006.01) |
| *G06F 3/0481* | (2013.01) |
| *G06F 3/0482* | (2013.01) |

(52) U.S. Cl.
CPC ........ *G06F 3/04847* (2013.01); *G06F 3/0481* (2013.01); *G06F 3/0482* (2013.01); *G06F 9/451* (2018.02); *G06F 9/542* (2013.01)

(58) Field of Classification Search
CPC ...... G06F 9/54; G06F 3/0484; G06F 3/04847; G06F 9/451; G06F 9/542
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,027,411 B1 | 4/2006 | Pulsipher |
| 7,028,301 B2 | 4/2006 | Ding |
| 7,062,683 B2 | 6/2006 | Warbenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |

(Continued)

*Primary Examiner* — Andrea C Leggett
(74) *Attorney, Agent, or Firm* — Fletcher Yoder PC

(57) ABSTRACT

The present disclosure relates to a mobile application and interface for event management. The mobile application may have various, configurable features, such as different information that may be displayed, different actions that may be performed, and so forth, such that a given organization or user can be provided with configured or customized levels of function. A designer of the mobile application may configure or select certain features to be available to different users or classes of users, such as to remove a feature that is not relevant to a specific user or group of users.

20 Claims, 10 Drawing Sheets

(56) References Cited

U.S. PATENT DOCUMENTS

| | | | |
|---|---|---|---|
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,457,928 B2 | 6/2013 | Dang |
| 8,478,569 B2 | 7/2013 | Scarpelli |
| 8,554,750 B2 | 10/2013 | Rangaranjan |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,887,133 B2 | 11/2014 | Behnia |
| 8,983,982 B2 | 3/2015 | Rangarajan |
| 9,015,188 B2 | 4/2015 | Behne |
| 9,037,536 B2 | 5/2015 | Vos |
| 9,137,115 B2 | 9/2015 | Mayfield |
| 9,239,857 B2 | 1/2016 | Trinon |
| 9,323,801 B2 | 4/2016 | Morozov |
| 9,412,084 B2 | 9/2016 | Kowalski |
| 9,467,344 B2 | 10/2016 | Gere |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,613,070 B2 | 4/2017 | Kumar |
| 9,659,051 B2 | 5/2017 | Hutchins |
| 9,792,387 B2 | 10/2017 | George |
| 9,852,165 B2 | 12/2017 | Morozov |
| 10,002,203 B2 | 6/2018 | George |
| 2013/0339400 A1* | 12/2013 | Pflughoeft | G06F 16/21 707/803 |
| 2014/0101248 A1* | 4/2014 | Felder | G06Q 50/01 709/204 |

* cited by examiner

CUSTOMIZABLE MOBILE APPLICATION FOR EVENT MANAGEMENT

BACKGROUND

The present disclosure relates generally to event management and, specifically, to a mobile application to manage alerts and services.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

One consequence of incorporation and reliance on computers and networks of devices in such contexts is that such devices and networks may be subject to service events and incidents, which may then impact users and operations relying on the devices. Managing and addressing such events provide their own challenges, including monitoring and addressing events from decentralized locations and the lack of flexibility that may be associated with conventional event management and monitoring approaches.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to the design and use of a mobile application and interface for event management. A user may utilize the mobile application to manage alerts and services. The mobile application may have various, configurable features, such as different information that may be displayed, different actions that may be performed, and so forth, such that a given organization or user can be provided with configured or customized levels of function. A designer of the mobile application may desire to configure or select certain features (i.e., to scope a given implementation of the application or interface) to be available to different users or classes of users, such as to remove a feature that is not relevant to a specific user or group of users. Further, the application and interface may be optimized or otherwise configured for use on a mobile or handheld device, such as a cellular telephone or tablet computer.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 11 is an embodiment of a service cards interface that may display different service cards on a mobile device, in accordance with aspects of the present disclosure.

DETAILED DESCRIPTION

Figure 1:
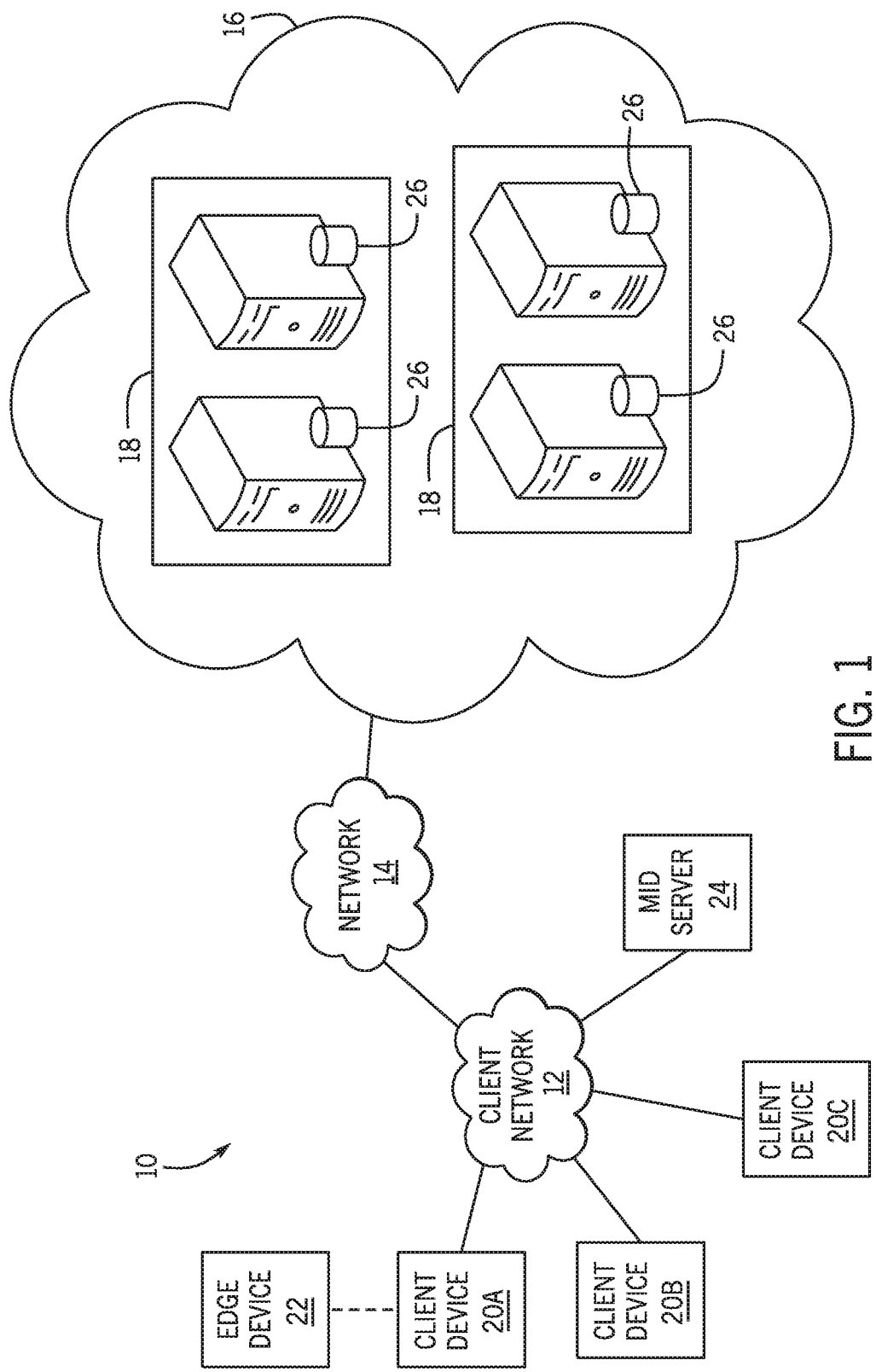
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The application may also include a plurality of applets. As used herein, the term "applet" refers to computing instructions included in the application to perform a particular function that supports the application. For example, the application may include different applets to perform actions associated with different types of resources. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a configuration management database (CMDB). As used herein, the terms alerts, incidents (INTs), changes (CHGs), and problems (PRBs) are used in accordance with the generally accepted use of the terminology for CMDBs. Moreover, the term "events" with respect to a CI of a CMDB collectively refers to alerts, INTs, CHGs, and PRBs associated with the CI.

An application, such as a mobile application, may be used to manage events, such as alerts and services in the context of a client instance. As primarily described herein, a user of a mobile application may perform an action to change or monitor a status of the alerts, such as to close or remove a particular alert or to initiate or configure a remediating action. Further, the user may monitor services and their respective statuses, which may be running or operating in a network or client instance. In one embodiment, the user may monitor such services, but is not given the capability of performing additional actions on the services when using the mobile application. Different users or groups of users may have different features enabled for their respective mobile application based on the configuration of the mobile application, such as by a designer of the mobile application via a design application. That is, the functionality provided users via such a mobile application may be of varying scope or configuration (i.e., a scoped application) for different entities or organizations, such as based on policies or preferences of each organization.

To allow configuration of such a mobile application in this manner, a design application may be provided for use. The design application may enable the designer to select certain features from a group of available features via different design tool interfaces of the design application. For example, the designer may select features based on the intended users of the mobile application, such as based on a degree of experience of the users, a classification or title of the users, a certification or licensing status of the users, and so forth. In this manner, the designer may quickly configure the mobile application without having to modify software code or otherwise design the mobile application. Furthermore, the design application may enable the designer to apply certain designs to a group of users. That is, instead of having to redesign or reconfigure the mobile application for each user, the designer may quickly apply a particularly configured version of the mobile application to multiple users having a common characteristic or grouping.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
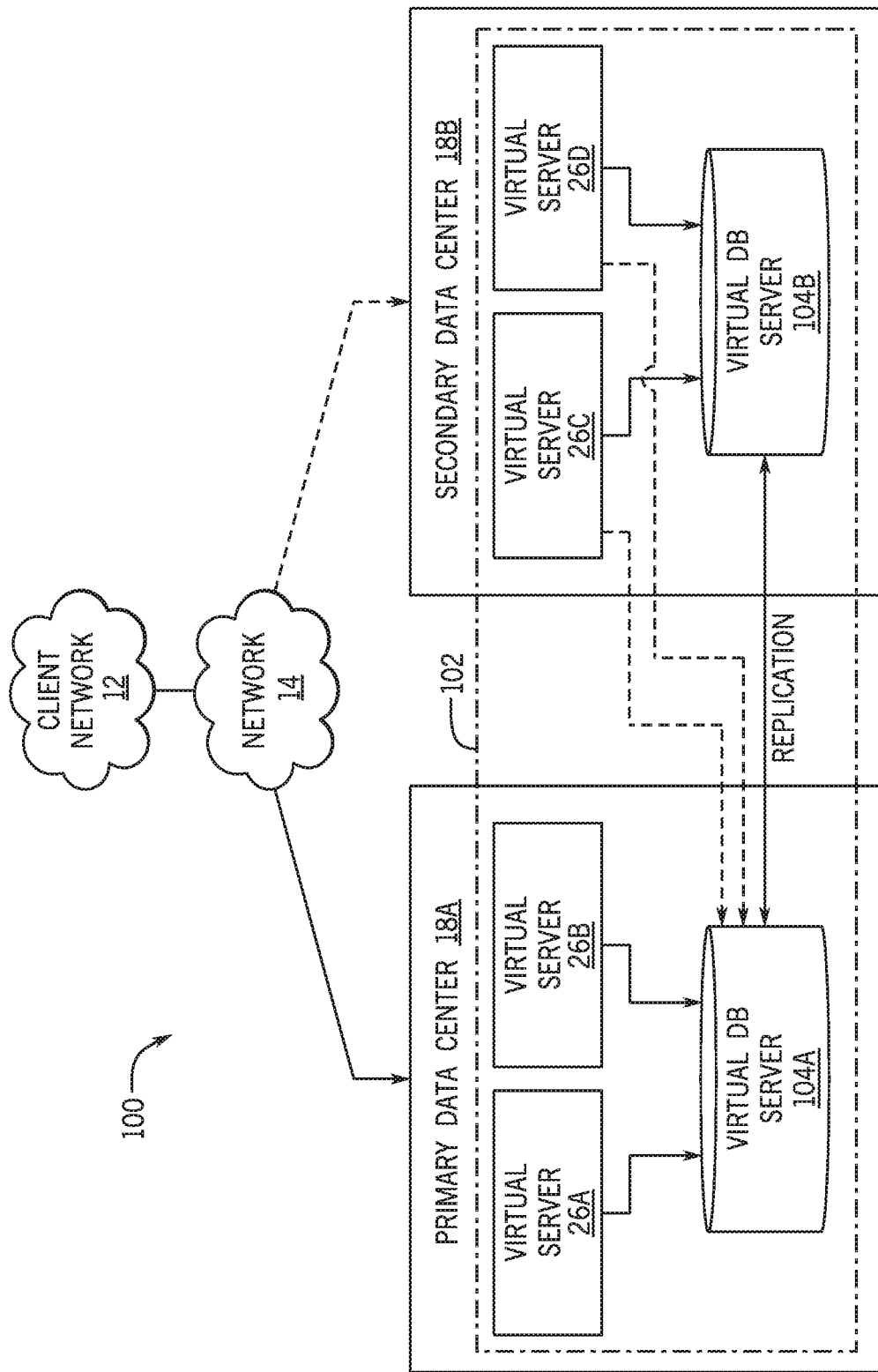
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
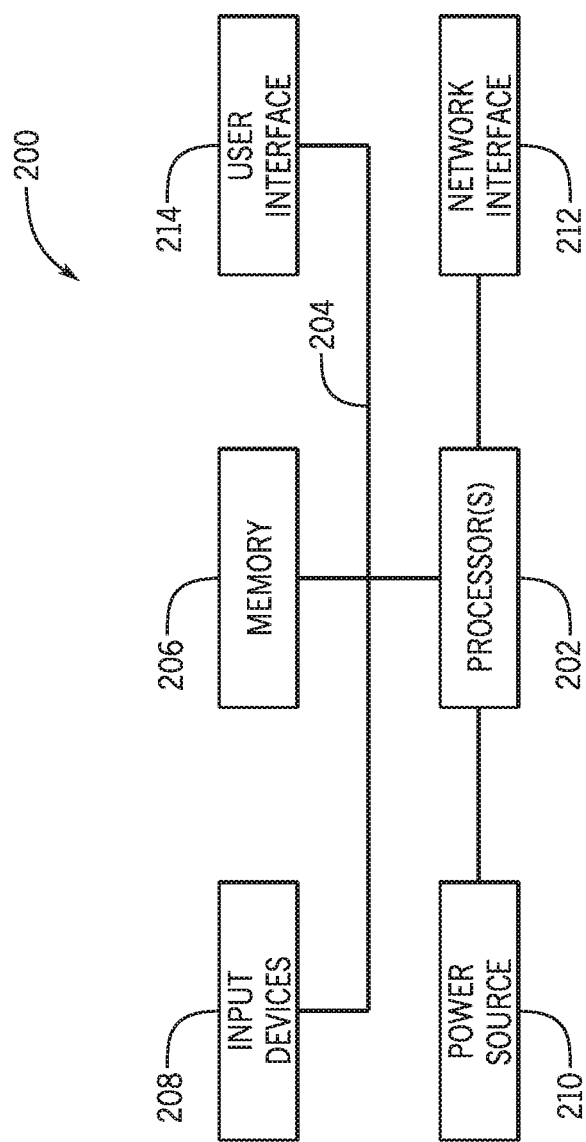
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
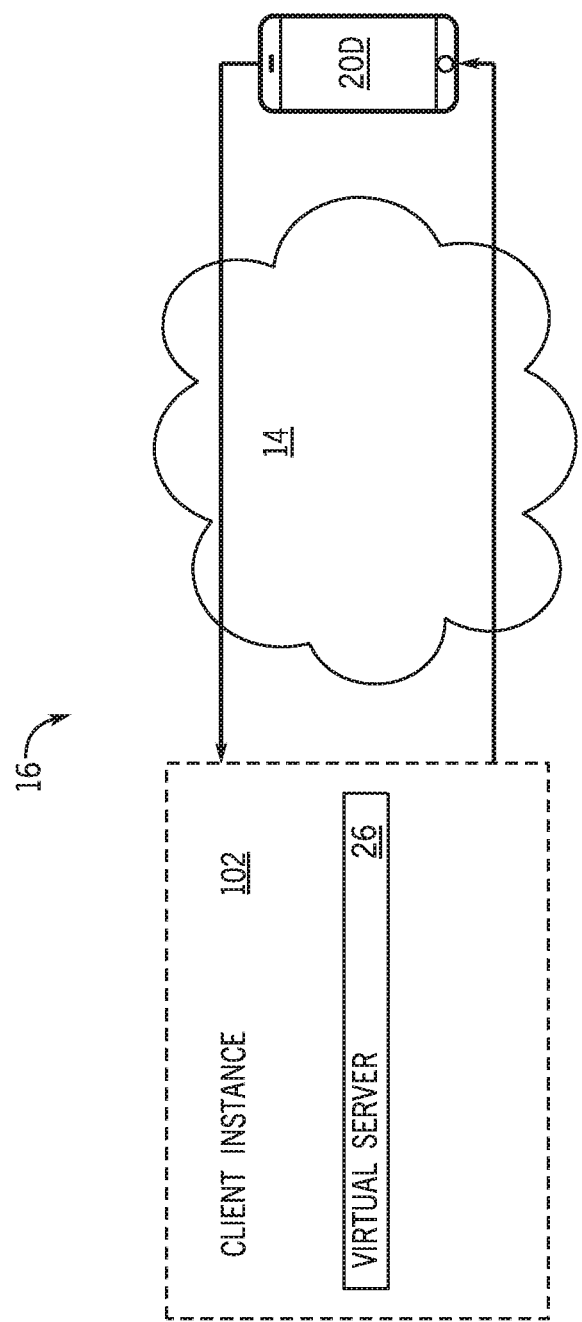
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 (here depicted as a mobile or handheld device (e.g., cellular telephone or tablet computer)) via the network 14 to provide a user interface to network applications executing within the client instance 102 (e.g., via a web browser or application running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As discussed herein, the client instance 102 may be implemented so as to support access to a mobile application (e.g., by a mobile device) to facilitate event management. The mobile application may be a cloud-based application running on the cloud-based platform 16 that is accessed via the client device 20. For example, the mobile application may be executed on an application server running on the cloud-based platform 16 and/or may access certain database tables stored on the cloud-based platform 16 related to events and event management. Such database table(s) may enable the availability and accessibility of certain features of the mobile application to a user.

Figures 5, 7:
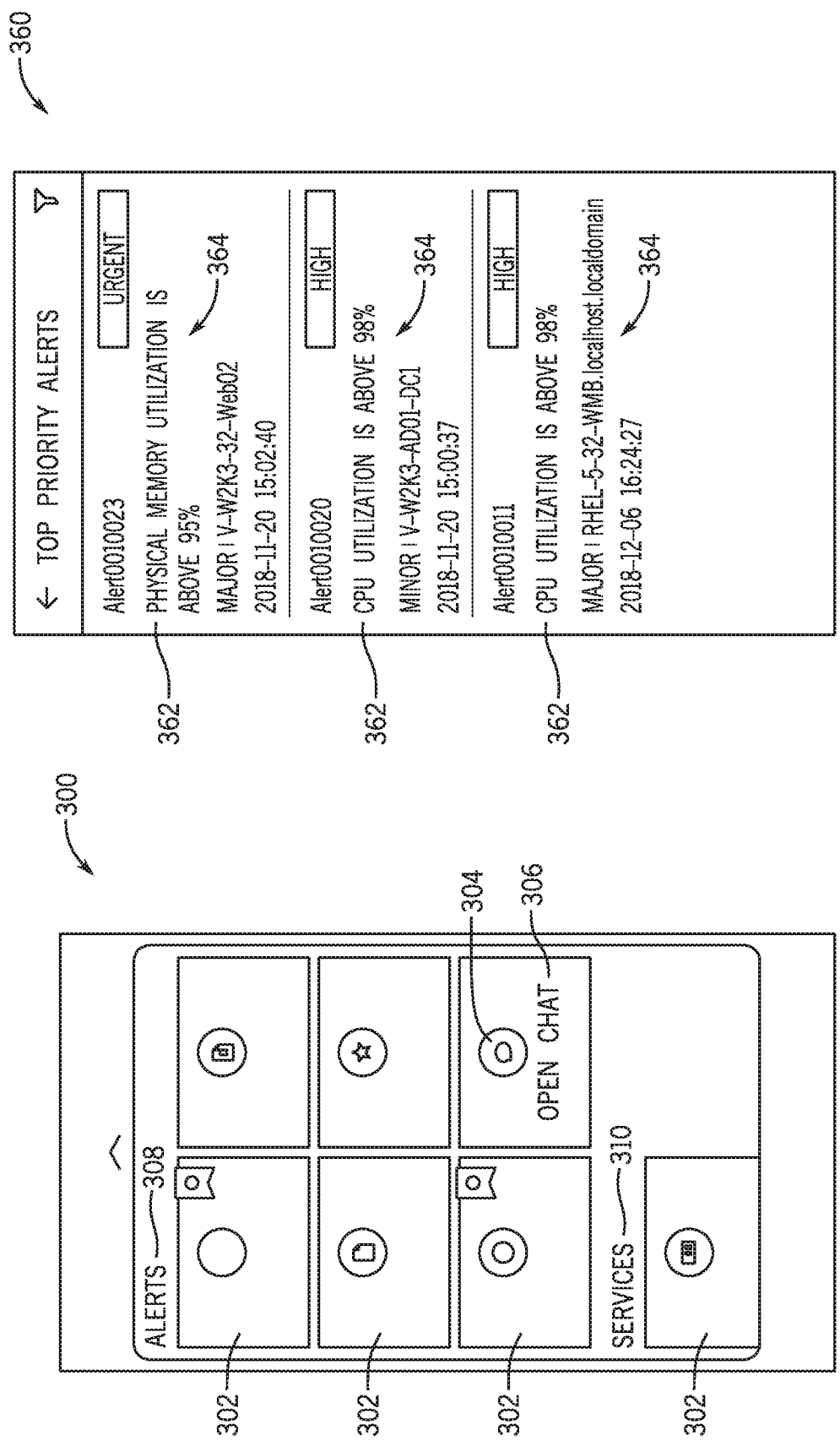
FIG. 5 is an embodiment of an interface that may be interacted with by a user via a mobile application for event management, in accordance with aspects of the present disclosure.
FIG. 7 is an embodiment of an alert cards interface that may display different alert cards on a mobile device, in accordance with aspects of the present disclosure.

As an example, FIG. 5 illustrates an embodiment of an interface 300 that may be initiated and interacted with by a user via a mobile application, such as by the client device 20. The application may be an event management application that enables a user of the mobile client device 20 to perform an action in regards to certain events. As used herein, an event includes alerts, services, incidents, and/or problems related to an IT infrastructure as described above. The event management application may include a plurality of applet cards 302 that each may represent an applet configured to perform a function. Each applet may be initiated upon selection of the corresponding applet card 302 via the interface 300. In some embodiments, each applet card 302 may include an icon 304, such as an image, that represents the applet. Furthermore, each applet card 302 may include a label 106 associated with the applet. The respective icon 304 and label 306 may distinguish each applet from one another and enable the user to determine the function of each applet.

In some embodiments, the applet cards 302 may be categorized into different folders that may organize each applet based on the event management function or event associated with the respective applet. In the illustrated implementation, the interface 300 includes an alerts folder 308 and a services folder 310. For example, each applet card 302 that is associated with an applet configured to perform an action on one or more alerts may be sorted under the alerts folder 308, and each applet card 302 that is associated with an applet configured to perform an action on one or more services may be sorted under the services folder 310. Although FIG. 5 illustrates there being six applet cards 302 under the alerts folder 308 and a single card under the services folder 310, there may be any number of applet cards 302 under either folder, such as no applet cards 302, five applet cards 302, or more than ten applet cards 302. Moreover, in additional or alternative embodiments, the interface 300 may include additional folders, such as an incidents folder, a problems folder, another suitable folder, or any combination thereof.

A designer of the mobile application may selectively enable certain features of an applet based on organizational policies or on user characteristics, such as displayed information and/or functions of the applet. The designer may enable different features for different users or groups of users such that the mobile application is scoped appropriately for the organization and users. That is, each user may be able to view and/or perform different features associated with a particular applet. The designer may use various design interface tools to configure each applet. In some embodiments, the designer may use a computing device, such as a mobile phone, a tablet, a laptop computer, a desktop computer, another suitable computing device, or any combination thereof, to access the design interfaces to configure each applet.

Figure 6:
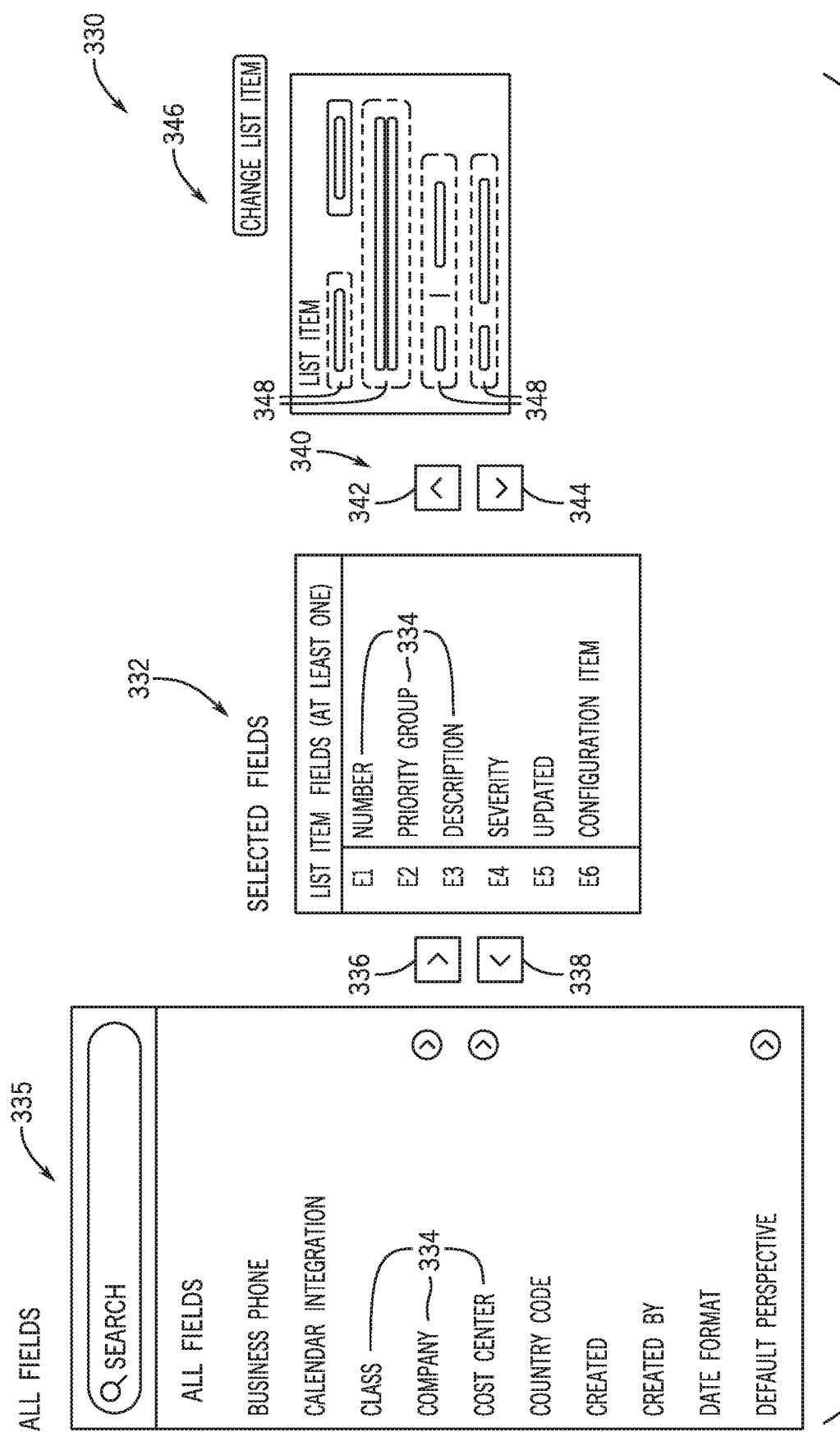
FIG. 6 is an embodiment of a first alert design interface that may be used to configure an appearance of alert cards on a mobile application such as shown in FIG. 5, in accordance with aspects of the present disclosure.

FIG. 6 is an embodiment of a first alert design interface 330, which may be a part of a design application accessible to the designer of the mobile application. The designer of the mobile application may use the first alert design interface 330 to configure the appearance (e.g., information fields displayed) of each alert card that may be displayed upon selection of one of the applet cards 302 under the alerts folder 308. The first alert design interface 330 may include an alert information list 332 that may correspond to or reference a database table stored on the platform 16. The database table may be configured to store certain alert information fields 334, which may be accessed or selected by a designer using the interface 330. In the illustrated embodiment, the alert information list 332 includes selected information fields corresponding to a number, a priority, a description, a severity, a time of update, and a configuration item that, based on their selection, may be provided as information fields on an alert card. In additional or alternative embodiments, other alert information fields 334 may be selected for display and shown in the alert information list 332. The designer may be able to select alert information fields 334 for inclusion as displayed fields on alert cards via the first alert design interface 330 and, therefore, change the information displayed on the alert cards of the mobile application interface for different users or groups of users.

By way of example, the designer may select a particular alert information field 334 from a first alert fields list or alert event management list 335 that includes all available alert information fields 334, such as by using an "include" editing arrow or icon 336 to select a particular alert information field 334 from the first alert fields list 335 of available fields for inclusion in the alert information list 332 to display on each alert card. Additionally, the designer may select another alert information field 334 that is included in the alert information list 332 and use an "exclude" editing arrow or icon 338 to remove the particular alert information field 334 from the alert information list 332 such that the particular alert information field 334 is not displayed on each alert card. In some embodiments, the designer may select different alert information fields 334 via navigation arrows 340 that are selectable icons used to navigate through each alert information field 334 sequentially. That is, the designer may select an up arrow 342 or a down arrow 344 to navigate the alert information list 332 sequentially. In additional or alternative embodiments, the designer may select different alert information fields 334 directly without having to navigate each alert information field 334 sequentially.

The first alert design interface 330 may also include an alert card display 346 that previews an appearance or layout of each alert card to the designer, in which the previewed appearance depicts how each alert card would be seen by the user of the mobile application. In other words, the alert card display 346 shows where each alert information field 334 from the alert information list 332 is displayed on the alert card. For example, the alert card display 346 may include alert information regions 348, in which each alert information region 348 is associated with an alert information field 334. In certain embodiments, the designer may adjust the position of each alert information region 348 to adjust how each alert card is displayed. For example, the designer may change where one of the alert information regions 348 is displayed on the alert card (e.g., via dragging and dropping the alert information region 348 pertaining to a particular alert information field 334).

FIG. 7 is an embodiment of an alert cards interface 360 that may be displayed by the mobile application upon selection of one of the applet cards 102 under the alerts folder 308 of the interface 100. The alert cards interface 360 may display different alert cards 362 associated with the selected applet card 102, in which each alert card 362 includes a plurality of alert information 364. In the illustrated embodiment, the alert cards interface 360 is associated with top priority alerts (e.g., alerts that are labeled as high and/or urgent), in which three different alert cards 362 are displayed on the alert cards interface 360. In additional or alternative embodiments the alert cards interface 360 may be associated with a different type of alert (e.g., low priority alerts or top severity alerts) having a different number of alert cards 362. Moreover, each alert card 362 may be displayed on the alert cards interface 360 suitable for display on mobile device and based on the configuration or layout specified by the designer, as described in the preceding discussion. For this reason, different types of alert information 364 may be displayed based on the configuration specified by the designer for a given entity or organization and/or the alert information 364 may be displayed in a different manner (e.g., in different positions on the alert cards interface 360) based on the configuration of the alert card display 346. Each alert card 362 may also be selectable by the user to display additional details pertaining to the particularly selected alert card 362, such as by opening an alert item corresponding to the selected alert card 362.

Figure 8:
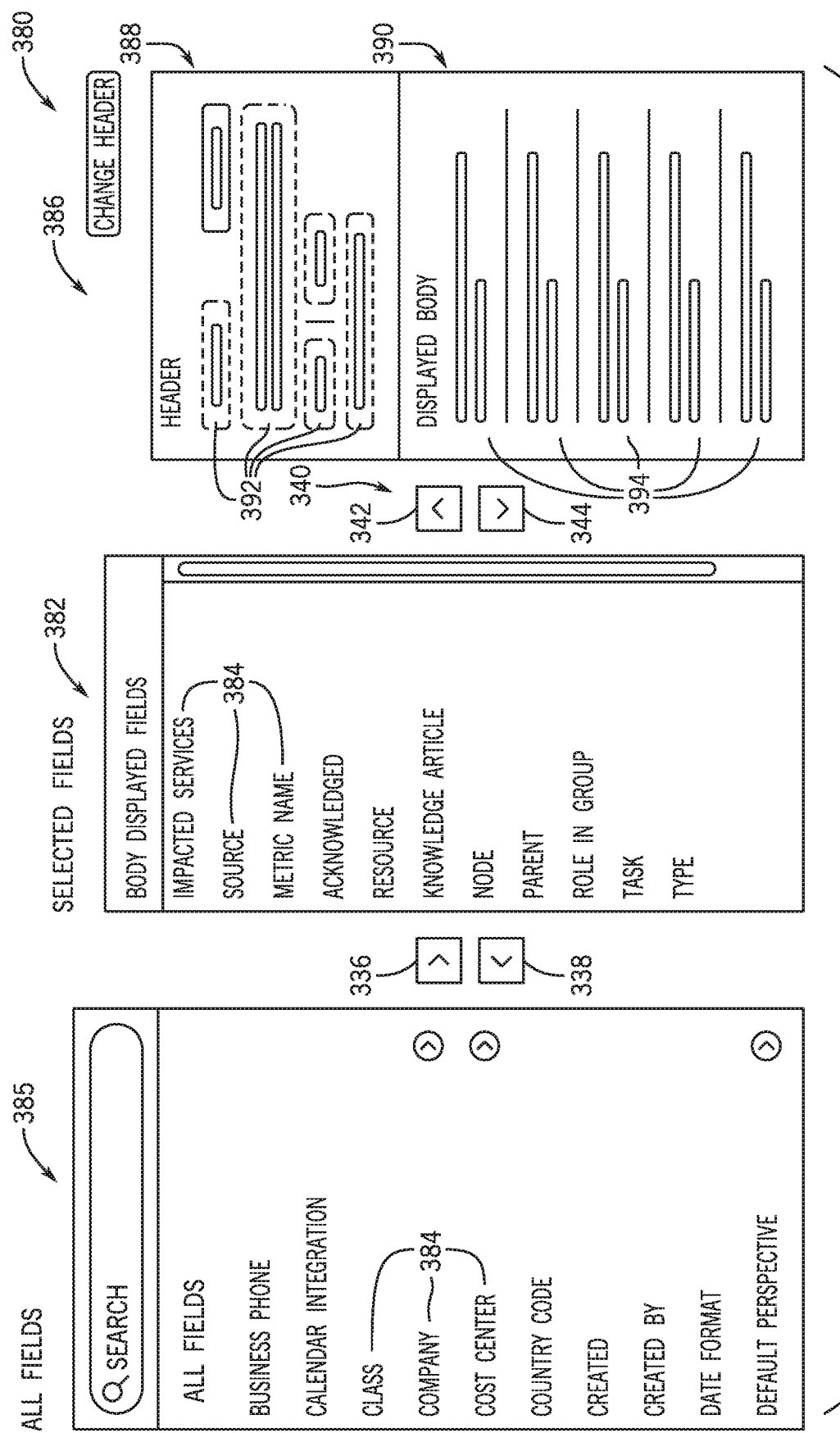
FIG. 8 is an embodiment of a second alert design interface that may be used to configure an appearance of alert items on a mobile application, in accordance with aspects of the present disclosure.

FIG. 8 is an embodiment of a second alert design interface 380, which may also be a part of the design application accessible by the designer. The designer may use the second alert design interface 380 to configure the appearance of each alert item (e.g., a detail view with respect to a selected alert) that is displayed by the mobile application upon selection of a respective alert card 362. That is, the designer may use the second alert design interface 380 to select the information that is viewable to the user when the user selects one of the alert cards 362 via the alert cards interface 360. The second alert design interface 380 may include an alert body list 382 that the designer may use to select alert body fields 384 displayed upon selecting any of the alert cards 362. In the illustrated embodiment, the alert body list 382 is configured to store alert body fields 384 that include impacted services, a source, a metric name, and so forth, but in additional or alternative embodiments, other suitable details may be available.

The alert body list 382 may be correspond to or reference the same or a different database table stored on the platform 16, from which the mobile application may determine the information fields displayed for each alert item. The alert body list 382 may be used by a designer to configure the particular information displayed by each alert item. For example, the designer may select alert body fields 384 from a second alert fields list or alert event management list 385 having all available alert body fields 384 for inclusion in a detail view for an alert using the "include" editing arrow 336 and the "exclude" editing arrow 338. Moreover, the designer may navigate the alert body list 382 using the navigation arrows 340 in the depicted example.

The second alert design interface 380 may also include an alert item display 386 that previews the appearance or layout of each alert item to the designer and enables the designer to change the appearance of each alert item. The second alert design interface 380 may include an alert header section 388 that displays event identifying and/or summary information associated with the alert item, such as the information displayed by each alert card 362 on the alert cards interface 360. The second alert design interface 380 may additionally include an alert body section 390 that displays detailed alert information associated with the alert item as configured by the designer and corresponding to alert body fields 384 of the alert body list 382. In this manner, the mobile application may display, in a format suitable for a mobile device, those alert information fields selected by the designer for a given user or group of users.

The alert header section 388 may include alert header regions 392, which may be similar to the alert information regions 348, and depict where selected event identifying and/or summary information (corresponding to fields selected from the alert information list 332) is displayed on the alert item. The alert body section 390 may include additional alert body regions 394, which depict where detailed alert information (corresponding to fields selected from the alert body list 382) is displayed on the alert item. The alert item display 386 may enable the designer to adjust the alert header section 388 and/or the alert body section 390, such as where the alert header regions 392 and the alert body regions 394 are displayed in the alert header section 388 and the alert body section 390, respectively. For example, the designer may drag and drop the alert header regions 392 and the alert body regions 394 to adjust the location of both the respective alert header regions 392 and alert body regions 394.

Figure 9:
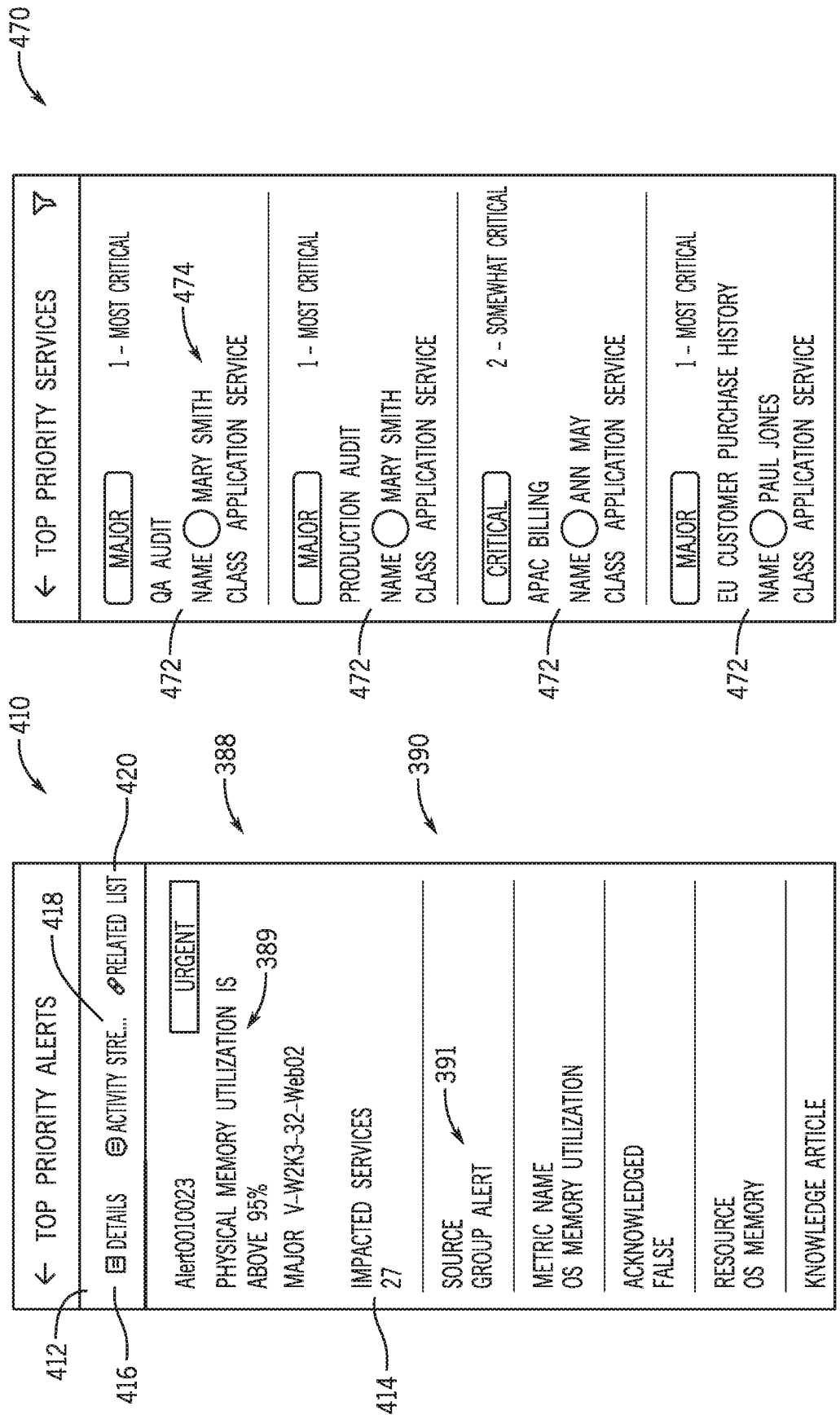
FIG. 9 is an embodiment of an alert item interface that may display an alert item on a mobile device, in accordance with aspects of the present disclosure.

FIG. 9 is an embodiment of an alert item interface 410 that may be displayed by the mobile application upon selection of one of the alert cards 362 of the alert cards interface 360. As shown in FIG. 9, selection of a particular alert card 362 displays an alert item 412 associated with the particular alert card 362. The alert item 412 displays additional information associated with the particular alert card 362 as determined by the designer via the second alert design interface 380. As shown in FIG. 9, the alert item 412 generally corresponds with the alert item display 386 and includes the alert header region 388 that displays a plurality of event identifying and/or summary alert information 389 based on the alert information list 332. For this reason, the event identifying and/or summary alert information 389 may be similar to or the same as the plurality of alert information 364. The alert item 412 also includes the alert body region 390 that displays alert details 391 based on the alert body list 382. In this manner, different alert details 391 may be displayed based on the configuration of the alert body list 382, and/or the alert details 391 may be displayed in a different manner based on the configuration of the alert item display 386. In certain implementations, further details may be displayed upon selection of a particular alert details 391. For example, upon selection of an impacted services field 414, a list of the impacted services may be displayed by the mobile application.

In some embodiments, the alert item 412 may include different categories that the user may select to display different information associated with the alert item 412. For example, the alert item 412 includes a details category 416, in which the alert item 412 displays the event identifying and/or summary alert information 389 and the alert details 391 as shown in FIG. 9. Additionally or alternatively, the alert item 412 includes an activity category 418, in which the alert item 412 may display activity information associated with the alert item 412 and may enable the user to perform certain actions that adjust a status of the alert item 412. As an example, the activity category may enable the designer to close or remove the alert item 412, mark or unmark the alert item 412 (e.g., as acknowledged, as a favorite alert item 412, as a particular category of alerts), perform a maintenance on the alert item 412, open an incident associated with the alert item 412, and so forth. The designer may be able to determine the available activity features associated with each alert item 412 in similar methods described above. That is, the designer may use another interface (e.g., an alert activity design interface) to configure another database table (e.g., an activity field selector table) stored on the platform 16 and configure another display (e.g., an activity display) to change the layout of activity fields on the alert item interface 410.

The alert item 412 may additionally or alternatively include a related category 420 that may display related information, including other events that are associated to the particular alert item 412. For example, the related information may include services impacted by the alert item 412, other alerts that appear as a result of the presence of the alert item 412, alerts similar to the alert item 412, related incidents, related problems, related changes, and so forth. Such information may be configured by the designer, such as by using a related information design interface to configure a related information selector table and a related information display.

Figure 10:
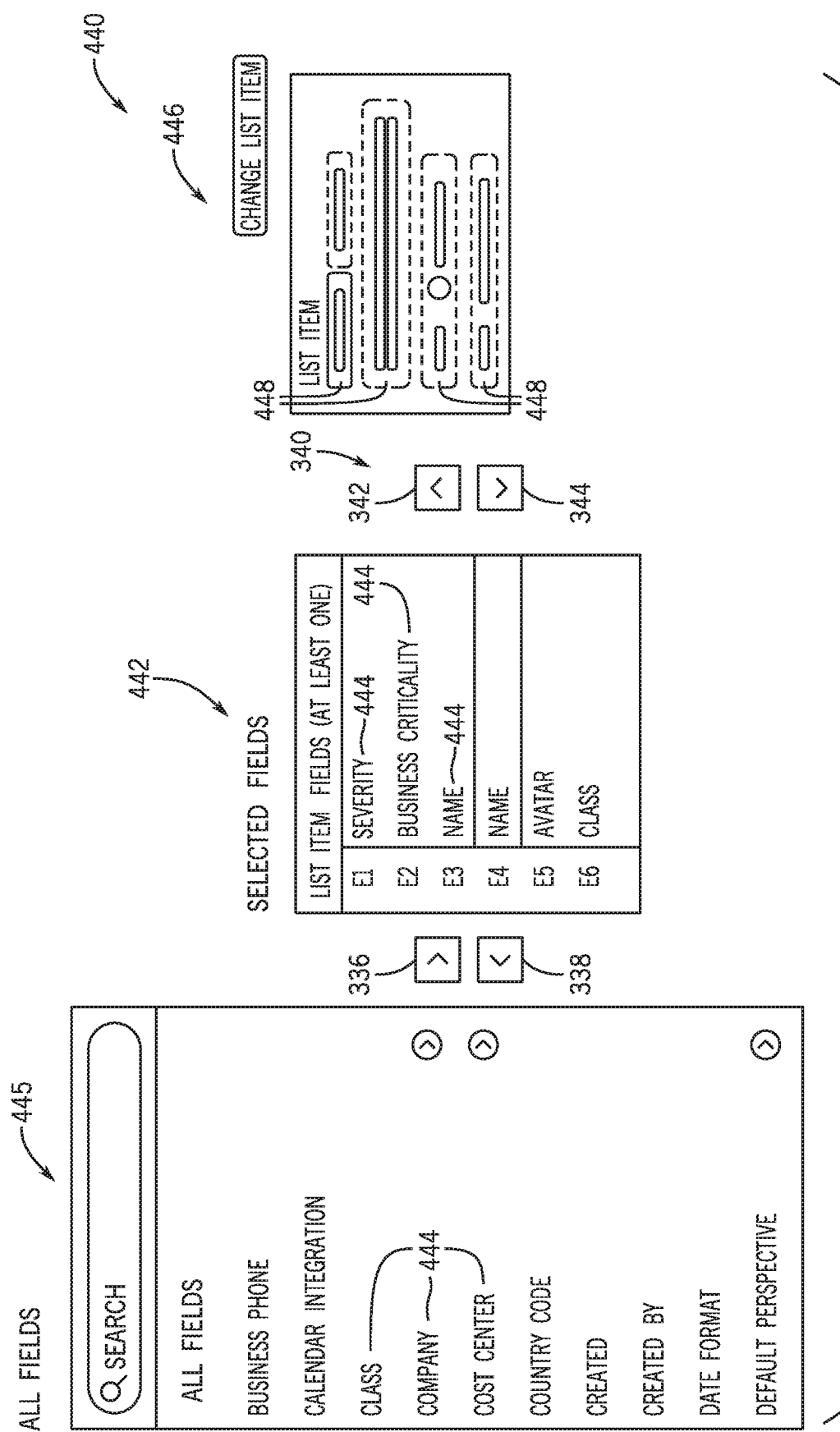
FIG. 10 is an embodiment of a first service design interface that may be used to configure an appearance of service cards on a mobile application, in accordance with aspects of the present disclosure.

The designer may also configure the appearance of other applets. For example, FIG. 10 is an embodiment of a first service design interface 440 of the design application, in which the first service design interface 440 may be accessible by the designer to configure the appearance of each service card that may be displayed upon selection of one of the applet cards 302 under the services folder 310. The first service design interface 440 may include a service information list 442, which may correspond to or reference another database table stored on the platform 16. The service information list 442 may be configured to store service information fields 444 such that information associated with the service information fields 444 will be displayed on each service card. As illustrated, the service information list 442 may be configured to store service information fields 444 that include a severity, a criticality, a service name, an owner name, an avatar, and a class, but additional or alternative service information fields 444 may be stored in the service information list 442.

The designer may configure service information fields 444 that are displayed on each service card via the first service design interface 440. For example, the designer may select service information fields 444 from a first service fields list or service event management list 445 having all service information fields 444 via the "include" editing arrow 336 such that the service information fields 444 are displayed on each service card to the user. The designer may also remove service information fields 444 from the service information list 442 via the "exclude" editing arrow 336 such that the service information fields 444 are not displayed on each service card to the user. The designer may select different service information fields 444 via the navigation arrows 340 and/or by selecting a certain service information field 444 directly.

The first service design interface 440 may include a service card display 446 that previews an appearance or layout of each service card to the designer and enables the designer to change the appearance of each service card. For example, the service card display 446 may include service information regions 448 that are each associated with a service information field 444 stored in the service information list 442. The designer may adjust the location of each service information region 448 on the service card display 446, such as via a drag and drop method, and the display of each service card to the user changes accordingly.

FIG. 11 is an embodiment of a service cards interface 470 that may be viewed by the user on a mobile device upon selection of one of the applet cards 102 under the services folder 310 of the interface 100. The service cards interface 470 may show different service cards 472 associated with the selected applet card 102, which is shown as top priority services (e.g., services that are labeled as major or critical) in the illustrated implementation. FIG. 11 shows four service cards 472, but additional or alternative embodiments may show a different number of service cards 472. Each service card 472 displays certain service information 474 based on the service information fields 444 stored in the service information list 442 as configured by the designer. As such, a different quantity of service information may be displayed based on the configuration of the service information list 442, and/or the service information may be displayed in a different manner based on the configuration of the service card display 446. Each service card 472 may also be selectable by the user to display additional service information pertaining to the selected service card 472.

Figure 12:
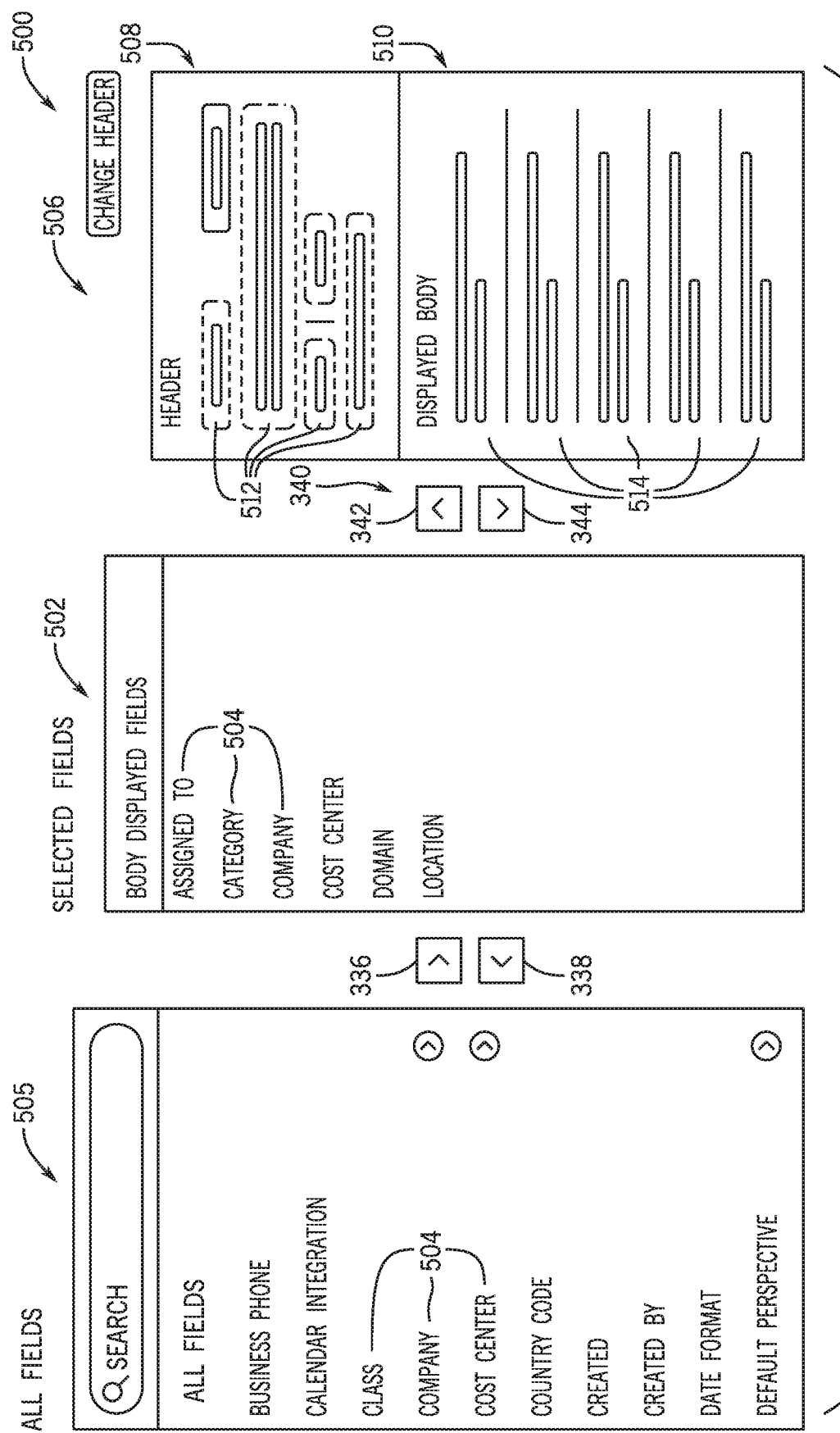
FIG. 12 is an embodiment of a second service design interface that may be used to configure an appearance of service items on a mobile application, in accordance with aspects of the present disclosure.

FIG. 12 is an embodiment of a second service design interface 500 of the design application accessible to the designer, in which the designer may use the second service design interface 500 to configure the appearance of each service item displayed to the user upon selection of a respective service card 472. Similar to the second alert design interface 380, the second service design interface 500 may include a service body list 502, which may be associated with another database table stored on the platform 16. The service body list 502 may be configured to store service body fields 504 as determined by the designer. The mobile application may refer to the service body list 502 to determine the corresponding service information 474 to display to the user.

For example, the designer may select service body fields 504 (e.g., from a second service fields list or service event management list 505 having all available service body fields 504) to be stored in the service body list 502 via the "include" editing arrow 336 for the mobile application to display corresponding information to the user, and may remove service body fields 504 from the service body list 502 via the "exclude" editing arrow 338 for the mobile application to remove corresponding information from display to the user. The second service design interface 500 may further include the navigation arrows 340 to enable the designer to select different service body fields 504. In the illustrated embodiment, the service body fields 504 may store fields such as an assignment, a category, a company, a cost center, a domain, and a location, but additional or alternative embodiments may store different service body fields 504.

The second service design interface 500 may also include a service item display 506 that previews the appearance or layout of each service item to the designer and enables the designer to change the appearance of each service item. Similar to the second alert design interface 380, the service item display 506 may include a service header section 508 that displays event identifying and/or summary information associated with the service item, which may be based on the service information fields 444 stored in the service information list 442. The service item display 506 may also include a service body section 510 that displays detailed information associated with the service item, which may be based on the service body fields 504 stored in the service body list 502. That is, the mobile application may access the service information list 442 to display event identifying and/or summary information associated with the service item to the user (e.g., in the service header section 508) and may access the service body list 502 to display detailed information associated with the service item to the user (e.g., in the service body section 510).

The service header section 508 may include service header regions 512 that may each correspond with a respective service information field 444 stored in the service information list 442. Moreover, the service body section 510 may include service body regions 514 that may each correspond with a respective service body field 504 stored in the service body list 502. The designer may adjust a position (e.g., via drag and drop) of each service header region 512 and/or each service body region 514 to change the layout of the service item displayed to the user.

The mobile application may enable the designer to configure other information associated with services. In some embodiments, the mobile application may include a related service design interface that the designer may use to configure the display of related information associated with each service item. For example, the related information may include related alerts, related incidents, related changes, related problems, and the like.

As should be noted, different versions or iterations of the alert information list 332, the alert body list 382, the service information list 442, and/or service body list 502 may be configured and stored for use by different users or groups of users. For example, the designer may configure the mobile application to provide different functionality and/or access to different users or groups of users via the mobile application. That is, for example, the designer may configure a first version of the alert information list 332 that stores a first plurality of alert information fields 334 and a second version of the alert information list 332 that stores a second plurality of different alert information fields 334 such that different users of the mobile application have different degrees of access or different experiences depending on the configuration accessed by their mobile device.

Thus, the designer may configure the mobile application to access a particular set of database fields or tables based on one or more characteristics of the user of the mobile application. For example, the mobile application may receive the characteristic (e.g., job title, degree of experience, geographic location) of the user (such as from other database fields or tables related to employees, positions, and so forth), and, based on the received characteristic, the mobile application may automatically access and reference corresponding database tables and fields available to that user for event management on a mobile device. Alternatively, the user's login information may be linked to a particular configuration or implementation of the mobile application suitable for their use.

The present disclosure is related to a mobile implementation of an event management application, in which certain settings associated with a user interface of the event management application are configurable based on user and/or organizational suitability. For example, the mobile event management application may be configured via a design interface, in which a designer of the event management application may select features that are available to a user interacting with the user interface. In some embodiments, the event management application may be used to manage alerts and services. The designer may select certain information associated with the alerts and services to be displayed on the user interface, such as from a list of available information. As an example, the designer may include and exclude features based on the user, such as a job title, geographic location, degree of experience, and so forth, to configure the event management application differently for different users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
one or more client instances hosted by a platform, wherein the one or more client instances support application and data access on one or more remote client networks, wherein the system is configured to perform operations comprising:
communicating with a mobile event management application configured to run on a mobile device on a respective remote client network, wherein the mobile event management application is configured to provide different levels of functionality for managing one or both of events or services to different users or groups of users, each level of functionality being associated with data from one or more tables, the data being indicative of a plurality of characteristics of a plurality of users;
in response to a communication with the mobile event management application, receiving login information of a user accessing the mobile event management application, the login information being linked to a respective characteristic of the plurality of characteristics;
selecting additional data from one or more tables based on the respective characteristic linked to the login information, wherein the additional data is indicative of a corresponding level of functionality to the user;
causing the display of one or more alert or service events on the mobile device in a layout based on the additional data, wherein the one or more alert or service events are limited to those for which the user of the mobile event application has been granted access based on the respective characteristic; and
in response to a selection of or interaction with one or more alert or service events, causing the display of additional details regarding the selected alert or service events or performing an operation related to the selected alert or service events.

2. The system of claim 1, wherein causing the display of the one or more alert or service events comprises causing the display of a plurality of alert information summaries or a plurality of service information summaries.

3. The system of claim 2, wherein causing the display of the plurality of alert information summaries or the plurality of service information summaries is based on a configuration of a respective alert or service information list, and wherein the alert and service information lists are each adjustable via a design application.

4. The system of claim 1, wherein causing the display of additional details comprises causing the display of a header and a body, wherein the header is configured to comprise event identifying and summary information and the body is configured to comprise event detail information.

5. The system of claim 4, wherein the event identifying and summary information is based on a first set of selected fields from one or more event management tables and the event detail information is based on a second set of selected fields from the one or more event management tables, wherein the first set and second set of selected fields are each configurable via a design application.

6. The system of claim 1, wherein the system is configured to perform operations comprising causing the display of one or more selectable event management applets, and wherein causing the display of one or more alert or service events on the mobile device is in response to a selection of a selected event management applet of the one or more selectable event management applets.

7. A mobile event management application configured to run on a mobile device, the mobile event management application comprising:

a first interface displaying one or more event management applets, wherein the one or more event management applets that are displayed are determined and presented in a first layout based on one or more characteristics of a user of the mobile event management application; and a second interface invoked in response to a selection of an event management applet on the first interface, wherein the second interface provides information related to one or more alerts or services and wherein the information provided is determined and presented in a second layout based on the one or more characteristics of the user of the mobile event management application;

wherein the mobile event management application is configured to perform operations comprising:

retrieving the one or more characteristics of the user via data from one or more tables storing a plurality of characteristics of a plurality of users;

accessing additional data from one or more tables, the additional data corresponding to the one or more characteristics, wherein the additional data indicates the first layout and the second layout; and configuring display of the first interface and the second interface based on the additional data.

8. The mobile event management application of claim 7, wherein the one or more characteristics comprises a job title, geographic location, degree of experience, or any combination thereof.

9. The mobile event management application of claim 7, wherein the information is based on a table related to event management.

10. The mobile event management application of claim 9, wherein the mobile event management application is configured to access the table based on the one or more characteristics of the user of the mobile event management application.

11. The mobile event management application of claim 7, comprising a third interface invoked in response to an interaction with the second interface, wherein the third interface provides additional information or functionality related to one of the alerts or services.

12. The mobile event management application of claim 11, wherein the additional information or functionality provided is determined based on the one or more characteristics of the user of the mobile event management application.

13. A design application for designing a mobile event management application, the design application comprising:

a first interface comprising a list of selectable fields available for inclusion on one or more user interfaces of the mobile event management application and a list of currently selected fields for inclusion on a respective user interface of the mobile event management application; and a second interface comprising a preview pane configured to provide a preview of a layout of currently selected fields, wherein the preview is defined by the second interface and is suitable for display on a mobile device, wherein the positioning of the currently selected fields is modifiable via the second interface to adjust the layout, and wherein the layout defined by the second interface is associated with a user characteristic such that the design application is configured to cause the mobile device to present the currently selected fields based on the layout in response to receiving the user characteristic.

14. The design application of claim 13, wherein the one or more interfaces comprise one or more of an applet selection interface, an alert or service summary list interface, or an alert or service detail interface.

15. The design application of claim 13, wherein the layout of the currently selected fields is modifiable to be an updated layout via the second interface such that the design application causes the mobile device to present the currently selected fields based on the updated layout instead of based on the layout in response to receiving the user characteristic.

16. The design application of claim 13, wherein the list of selectable fields is populated from one or more tables related to event management present in a database.

17. The design application of claim 13, wherein each selectable field of the list of selectable fields are selectively included in the list of currently selected fields, and wherein each currently selected field of the list of currently selected fields are selectively removed from the list of currently selected fields.

18. The design application of claim 17, wherein the first interface comprises one or more selectable navigation and editing icons configured to include a selectable field of the list of selectable fields in the list of currently selected fields, remove a currently selected field from the list of currently selected fields, navigate the list of selectable fields, navigate the list of currently selected fields, or any combination thereof.

19. The design application of claim 13, wherein the second interface comprises an additional preview pane configured to provide a preview of an additional layout of additional currently selected field, wherein the additional layout is defined by the second interface and is suitable for display on the mobile device, wherein the additional layout defined by the second interface is associated with an additional user characteristic such that the design application is configured to cause the mobile device to present the additional currently selected fields based on the additional layout instead of based on the layout in response to receiving the additional user characteristic.

20. The design application of claim 13, wherein the design application is configured to receive a user input via the first interface to include an additional currently selected fields, and wherein the preview pane of the second interface is configured to update the preview of the layout to include the additional currently selected fields such that the design application is configured to cause the mobile device to present the additional currently selected fields based on the layout in response to receiving the user characteristic.

* * * * *